(12) United States Patent
Zeng et al.

(10) Patent No.: US 10,154,445 B2
(45) Date of Patent: Dec. 11, 2018

(54) AP HANDOVER METHOD IN INDUSTRIAL MOBILE NETWORK BASED ON DOUBLE WIRELESS NETWORK INTERFACE CARDS

(71) Applicant: SHENYANG INSTITUTE OF AUTOMATION OF THE CHINESE ACADEMY OF SCIENCES, Liaoning (CN)

(72) Inventors: Peng Zeng, Liaoning (CN); Jindi Liu, Liaoning (CN); Dong Li, Liaoning (CN); Zhibo Li, Liaoning (CN); Xueting Yu, Liaoning (CN); Haibin Yu, Liaoning (CN)

(73) Assignee: SHENYANG INSTITUTE OF AUTOMATION, CHINESE ACADEMY OF SCIENCES, Shenyang, Liaoning (CN)

( * ) Notice: Subject to any disclaimer, the term of this patent is extended or adjusted under 35 U.S.C. 154(b) by 29 days.

(21) Appl. No.: 15/527,633

(22) PCT Filed: Dec. 30, 2014

(86) PCT No.: PCT/CN2014/095571
§ 371 (c)(1),
(2) Date: May 17, 2017

(87) PCT Pub. No.: WO2016/082283
PCT Pub. Date: Jun. 2, 2016

(65) Prior Publication Data
US 2017/0339615 A1    Nov. 23, 2017

(30) Foreign Application Priority Data
Nov. 30, 2014 (CN) .......................... 2014 1 0719075

(51) Int. Cl.
*H04W 36/18* (2009.01)
*H04W 84/12* (2009.01)
(Continued)

(52) U.S. Cl.
CPC .......... *H04W 36/18* (2013.01); *H04W 36/08* (2013.01); *H04W 36/245* (2013.01); *H04W 36/30* (2013.01); *H04W 84/12* (2013.01)

(58) Field of Classification Search
None
See application file for complete search history.

(56) References Cited

U.S. PATENT DOCUMENTS 8,086,210 B2 * 12/2011 Sivchenko ............ H04W 8/087
370/282
8,355,382 B2 * 1/2013 Pradeep ............ H04W 36/0022
370/331
(Continued)

FOREIGN PATENT DOCUMENTS

CN    101394364 A    3/2009
CN    101631371 A    1/2010
(Continued)

OTHER PUBLICATIONS

International Search Report dated Sep. 6, 2015 for PCT/CN2014/095571 (4 pages—Chinese with English machine translation).

*Primary Examiner* — Hong S Cho
(74) *Attorney, Agent, or Firm* — Smith, Gambrell & Russell, LLP

(57) ABSTRACT

The present invention provides an AP handover method based on double wireless network interface cards. A mobile terminal actively scans the signal strength of an AP, compares the scanned signal strength with the signal strength of a currently accessed AP, and if the signal strength is greater than the signal strength of the current AP, starts handover; otherwise, continuously scans till the handover succeeds. To reduce the handover delay and in accordance with the characteristic that the moving paths are basically fixed in industrial application scenarios, the present invention provides a pre-learning mechanism, that is, before formal application, information such as the location of the AP and the handover sequence in the application scenario is learned (Continued)

and stored in a terminal node, so that specific scanning and handover can be implemented in formal application. The present invention solves the problem of rapid AP handover in the industrial mobile network scenario, the double wireless network interface cards are used to achieve handover without interruption, and the pre-learning mechanism is used in specific industrial application scenarios, so the scanning delay is further reduced.

7 Claims, 3 Drawing Sheets

(51) Int. Cl.
*H04W 36/30* (2009.01)
*H04W 36/08* (2009.01)
*H04W 36/24* (2009.01)

(56) References Cited

U.S. PATENT DOCUMENTS

2008/0186917 A1* 8/2008 Wu .................. H04W 36/10
370/331
2010/0137001 A1* 6/2010 Cho .................. H04W 48/20
455/456.1

FOREIGN PATENT DOCUMENTS

| CN | 101640895 A | 2/2010 |
| CN | 102209354 A | 10/2011 |
| CN | 103973800 A | 8/2014 |

\* cited by examiner ent invention relates to the field of AP handover
AP HANDOVER METHOD IN INDUSTRIAL MOBILE NETWORK BASED ON DOUBLE WIRELESS NETWORK INTERFACE CARDS

TECHNICAL FIELD

The present invention relates to the field of AP handover in an industrial mobile network, and in particular to an AP handover method in an industrial mobile network based on double wireless network interface cards.

BACKGROUND

With the rapid development of the technologies of control, communication, computers, networks and the like, the information integration technology of an enterprise is rapidly developed from the factory site control to the product storage and transportation process. An industrial network plays an increasingly vital role in the fields of increasing the production speed, managing the production process, performing reasonable and efficient processing and the like. In recent years, the Ethernet enters the field of industrial control, and a great number of Ethernet-based industrial control networks appear. Meanwhile, with the development of the wireless technology, wireless-based industrial control networks gradually rise.

The WiFi technology is widely applied due to the advantages of low cost, rapid deployment and the like, and a research on WiFi-based industrial control networks is also conducted. For the handover problem caused by movement of terminal nodes, the 802.11 standard does not make clear specifications, so each WiFi equipment manufacturer deals with the problem independently. Although the latest 802.11r standard refines the technical specification for handover among APs, the standard only describes the handover process of a mobile terminal node (MN) from disconnection from an original AP to access into a new AP. Since the WiFi coverage range is limited, a terminal user frequently conducts the handover from one AP to another AP in the field of mobile application environment. Therefore, how to realize rapid and autonomous handover among APs becomes critical in the further development and application of WiFi.

When a data packet is transmitted in a network, the switch which forms a basic architecture of a wired network needs time to learn the location of each MAC address and then determines the switching path of data. Under an application scenario of rapid movement, the mobile terminal needs to continuously conduct rapid handover among a plurality of WiFi nodes in the process of transmitting and receiving the data. When WiFi network connection of the mobile terminal is hopped, a data flow to the mobile terminal still points to a wrong destination address. Such a condition continues until the switch learns a new location of the mobile terminal, which leads to sustained interruption of the data flow of the terminal user. To ensure that the mobile terminal conducts the handover among the WiFi nodes in time, a system needs to conduct sustained scan. When the speed is increased, the handover time will become a major problem. A research result indicates that the handover delay among APs is at least above hundreds of ms; moreover, at least 90% of delay is derived from a scanning stage, and the time consumed for certification and association is less than 10%. To this end, the scanning delay shall be reduced as far as possible so as to realize rapid AP handover.

As the research on the WiFi mobile applications constantly goes deeper, autonomous handover among the APs attracts more and more attention. However, the research finds that WiFi cannot realize rapid and autonomous handover among the APs.

SUMMARY

In view of a handover problem in an industrial network based on WiFi, the present invention proposes an AP handover method in an industrial mobile network based on double wireless network interface cards, so as to reduce the handover delay by adopting a hardware device with double wireless network interface cards and a pre-learning mechanism, thereby satisfying the demand of transmission without interruption in the industrial network.

To realize the above-mentioned purposes, the present invention discloses the technical solution: an AP handover method in the industrial mobile network based on double wireless network interface cards comprises the following steps:

step 1: in the learning process, a mobile terminal stores AP basic information scanned on a moving track and a handover sequence, and saves the same into a storage unit of the mobile terminal;

step 2: in the process of continuous movement of the mobile terminal, detection packets are continuously transmitted to the periphery, and if feedback information is received, it is proved that the detection packets enter other AP coverage ranges;

step 3: when a new AP is scanned, the mobile terminal invokes historical stored information, judges that a next hop shall be switched to which AP, then scans signal strength with respect to a next-hop AP, monitors the signal strength of the AP in real time and compares the scanned signal strength with the signal strength of the current AP;

step 4: when the signal strength of the next-hop AP is greater than the signal strength of the currently accessed AP, a handover algorithm is triggered, namely, functions of double wireless network interface cards are exchanged through a bonding technology;

step 5: a routing table of the mobile terminal is modified and a successful handover message is transmitted to a controller;

step 6: after the controller receives the successful handover message, a corresponding flow table is modified and the information is stored into topological information of the controller;

step 7: when the mobile terminal moves off an original AP coverage range, the double wireless network interface cards of the mobile terminal are in a redundant backup functional state, namely, only one wireless network interface card is active; and when one wireless network interface card is down, the other wireless network interface card is immediately backed up into an active state until a next handover process is entered after the new AP is scanned.

The AP basic information recorded in the learning process comprises: a relative location of the AP, an SSID of the AP, an address of the AP and a channel of the AP.

The handover time in the step 4 is as follows:

Since the AP coverage range is limited, the time when terminal nodes which move quickly are within each AP coverage range is short; after the new AP is scanned by the nodes of the mobile terminal, the mobile terminal enters a signal strength comparison stage; and when the NAP signal strength is greater than or equal to OAP signal strength, the AP is switched and connected to the next-hop AP.

The handover comprises three stages: a handover preparation stage, a handover stage and a handover completion stage.

The handover preparation stage is as follows: a new AP signal is found in the process of data transmission of the MN and the OAP; then, a channel used by the NAP is inquired; and the NAP signal strength is scanned with respect to a specific channel, and compared with the OAP signal strength in real time. The handover stage is as follows: when the NAP signal strength scanned by the MN is greater than or equal to the OAP signal strength, the MN transmits certification and association to the NAP; after a response message is successfully accepted, the MN transmits a handover request to the controller; after the controller confirms the handover, a flow table modification command is issued; and the handover is completed after the flow table is modified in response to the AP, and data transmission can be normally performed.

The AP and the mobile terminal have several antenna combinations according to characteristics of different antennas, including AP omni-directional antenna/MN directional antenna, AP directional antenna/MN omni-directional antenna, and AP directional antenna/MN directional antenna.

The double wireless network interface cards are adopted by the mobile terminal.

Channels for communication between the mobile terminal and an adjacent AP are not overlaid.

The present invention has the following advantages and beneficial effects of solving the AP handover problem of an SDN-based industrial backhaul network and realizing rapid seamless handover among different APs. In the present invention, the mechanism of the double wireless network interface cards and the bonding technology are adopted; different tasks are allocated for different wireless network interface cards; and operating states between the double wireless network interface cards are continuously switched, so as to realize seamless soft handover. The handover objective of the next hop is defined and a ping-pong effect in the handover process due to reflected refraction and the like is avoided through the pre-learning mechanism. In addition, the present invention proposes a handover time decision algorithm and a non-overlaying soft handover channel allocating mechanism with respect to an industrial application scenario. These mechanisms can greatly reduce the handover delay and the packet loss ratio and satisfy the application demand of the industrial scenario.

DETAILED DESCRIPTION

The present invention will be further described in details below in combination with the drawings and the embodiments.

Figure 1:
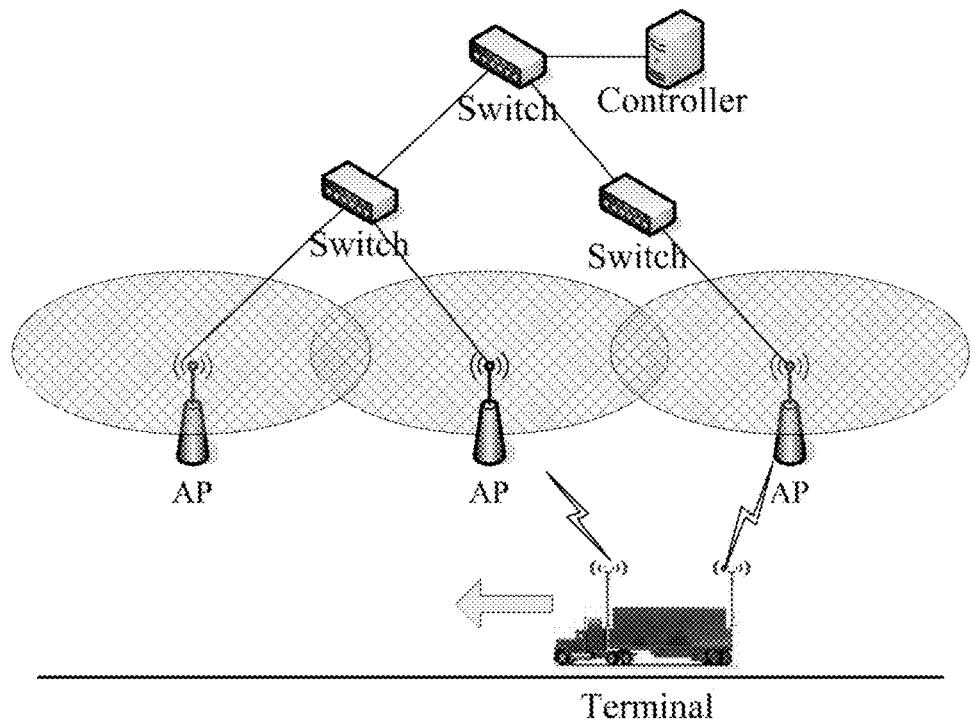
FIG. 1 is a schematic diagram of an industrial backhaul network of the present invention.

The present invention realizes a non-interruption handover method in an industrial mobile network architecture. The industrial mobile network architecture is an SDN-based industrial backhaul network architecture as shown in FIG. 1. The SDN-based industrial backhaul network architecture supports an openflow protocol, and realizes data storage and forwarding through the flow table. The nodes of the mobile terminal are connected with the AP through WiFi. Since the AP coverage range is limited, the mobile terminal needs to continuously perform handover among the APs.

The present invention comprises the pre-learning mechanism, a handover time decision method, a non-overlaying channel allocating mechanism, an entire handover flow and the like which will be described in details one by one below.

1. Pre-Learning Mechanism

The pre-learning mechanism proposed in the present invention stores the AP basic information, the handover sequence of the terminal and the like into the mobile terminal with respect to the feature that a moving line of the industrial application scenario is basically fixed. A specific handover target AP is scanned and the signal strength of the next-hop AP is acquired, so as to prepare for the handover decision algorithm.

A pre-learning process means a test process performed on the track before the mobile terminal starts formal operation. Since the application aims at the feature of the industrial scenario, the AP location is relatively fixed and the channel used by the AP is also fixed. The learning process mainly focuses on recording the AP basic information, mainly including: a relative location of the AP, an SSID of the AP, an address of the AP and a channel of the AP. AP information is saved and maintained by the MN terminal. The information format is as follows:

| No. | SSID | IPaddress | MACaddress | channel | NextAP |
|---|---|---|---|---|---|
| 1 | AP1 | 192.168.2.4 | 8C-89-A5-C1-9D-5A | 1 | AP2 |
| 2 | AP2 | 192.168.2.6 | 8C-89-A5-D6-3C-7B | 6 | AP3 |
| 3 | AP3 | 192.168.2.8 | 8C-89-A5-B2-2A-4D | 1 | AP4 |

In the practical handover process, the handover target AP can be quickly found by using the AP information saved in the MN (mobile terminal), so as to further reduce the handover delay. In the actual operation, the handover and the data transmission are realized through two parallel antennas. A concrete realization method will be described below in details.

2. Handover Time Decision Mechanism

The present invention proposes the handover time decision algorithm, and researches the trigger time of the handover. The proposed handover time decision algorithm is based on an active scanning method. Considering the change in the signal strength received by the mobile terminal and the AP, the historical information switched by the mobile terminal and the AP signal strength received by the current mobile terminal, not only timely completion of the handover is ensured, but also the ping-pong effect in the handover process can be reduced.

The present invention is a soft handover method based on double wireless network interface cards. Therefore, an appropriate soft handover channel allocating mechanism needs to be selected. In the present invention, the non-overlaying channel allocating mechanism is adopted. Since the omni-directional antenna and the directional antenna can be selected by radio frequency modules of the AP and the MN, the antennas can have several combinations according to the characteristics of different antennas, including AP omni-directional antenna/MN directional antenna, AP directional antenna/MN omni-directional antenna, and AP directional antenna/MN directional antenna. The first two channel allocating mechanisms have requirements for the relative locations of the double wireless network interface cards on the MN. When the moving speed of the mobile terminal is increased, the spacing of the double wireless network interface cards is required to be increased. Therefore, the first two channel allocating mechanisms are not suitable for the condition that the MN has a small unit volume. The AP directional antenna/MN directional antenna mechanism can be used for the occasion that the MN has a small volume and the spacing between two antennas is very small.

Since the AP coverage range is limited, which is only several hundred meters, the time when the terminal nodes which move quickly are within each AP coverage range is short; when the MN leaves the current access point (old AP, OAP) by a certain distance, the MN needs to enter a handover state, completes the handover before thoroughly leaving the OAP coverage range, and is connected to the next-hop access point (Next AP, NAP). A handover time decision is to research that when the mobile terminal triggers the handover is most favorable for realizing rapid handover.

Figure 2:
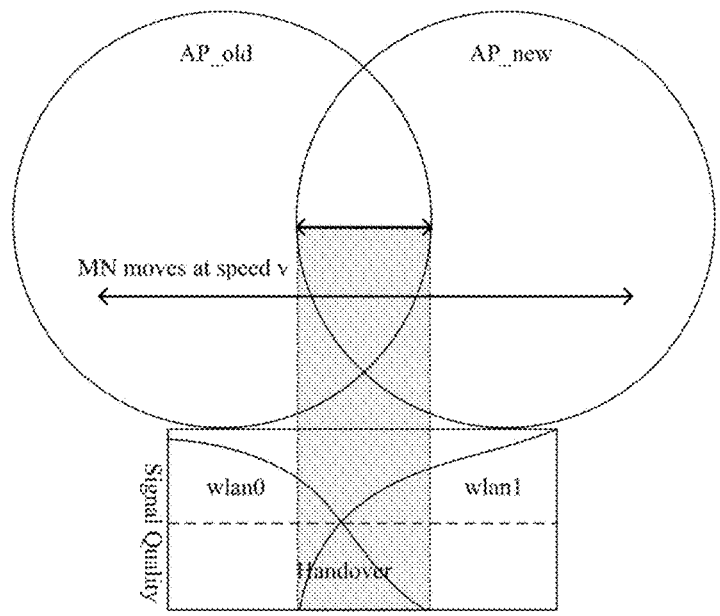
FIG. 2 is a schematic diagram of a handover decision algorithm of the present invention.

If the handover is started too late, i.e., the handover is started when the MN leaves the OAP by a too long distance, the OAP may not provide reliable wireless connection for the MN before the handover is completed. At this moment, the system is disconnected and the handover fails, causing serious loss of data. It is not to say that the earlier the handover is started, the better. If an NAP signal is not strong enough to determine the NAP in an attempt to the handover, a neighbor AP needs to be discovered repeatedly, causing the waste of massive time and the increase of the handover delay. Therefore, the selection of the appropriate handover time is significant for successfully completing the handover and reducing the handover delay. FIG. 2 gives the schematic diagram of the handover time decision.

Figure 3:
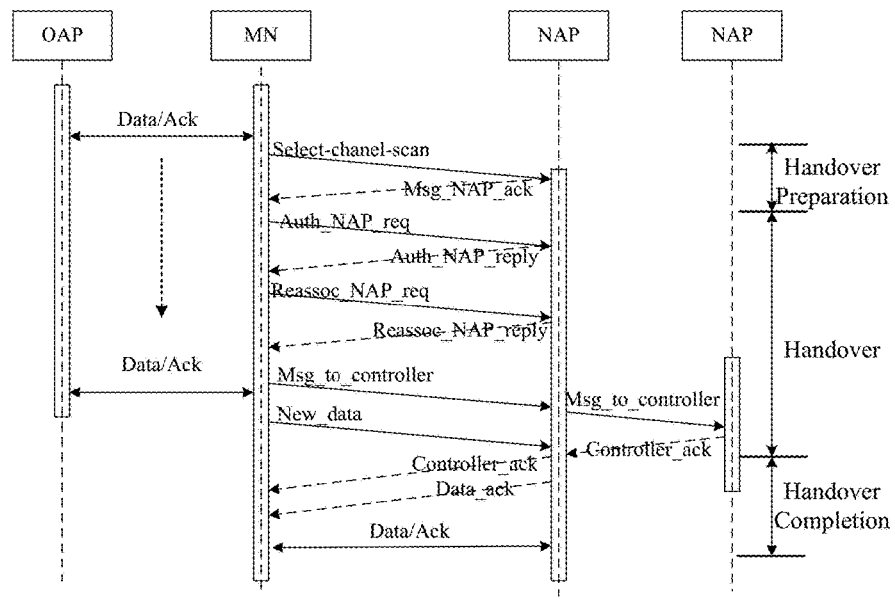
FIG. 3 is a sequence diagram of a handover process of the present invention.

FIG. 3 gives the handover process of the MN between the OAP and the NAP. The handover comprises three stages: the handover preparation stage, the handover stage and the handover completion stage. The conditions of ping-pong handover and connection interruption will not occur since the pre-learning mechanism and the hardware device with double wireless network interface cards are adopted in the present invention, the NAP is clear and the MN and the Internet are always in a connection state in the terminal process. A signal strength comparison method is adopted in the present invention for making a handover decision. When the NAP signal strength is greater than the OAP signal strength, the handover is performed decisively. Although this method is simple, the algorithm efficiency of the application scenario considered with respect to the present invention is very high and the handover effect is not influenced.

3. Non-Overlaying Channel Allocating Mechanism

Since the handover delay is mainly formed by the scanning delay, the non-overlaying channel allocating mechanism is adopted in the solution, thereby reducing the number of scanning channels and further reducing the handover delay. Double-link soft handover is adopted in the solution. Therefore, double wireless network interface cards need to be arranged on the MN, so as to provide double wireless links. The AP may be a standard device that supports the IEEE802.11 protocol.

Since the omni-directional antenna and the directional antenna can be selected by radio frequency modules of the AP and the MN, the antennas can have several combinations according to the characteristics of different antennas, including AP omni-directional antenna/MN directional antenna, AP directional antenna/MN omni-directional antenna, and AP directional antenna/MN directional antenna. The first two channel allocating mechanisms have requirements for the relative locations of the double wireless network interface cards on the MN. Namely, a spacing enough to complete a handover must exist. When the MN moves at a speed of 40 km/h, a rapid handover algorithm is adopted; the delay of one handover is about 200 ms; the MN travels by about 2 meters during the handover, namely a distance between two antennas is required to be at least 2 meters; and when the MN moves at an increased speed, the spacing of the double wireless network interface cards is required to be larger. Therefore, the above two channel allocating mechanisms are not suitable for the condition that the MN has a small unit volume. The AP directional antenna/MN directional antenna mechanism can be used for the occasion that the MN has a small volume and the spacing between two antennas is very small.

Figure 4:
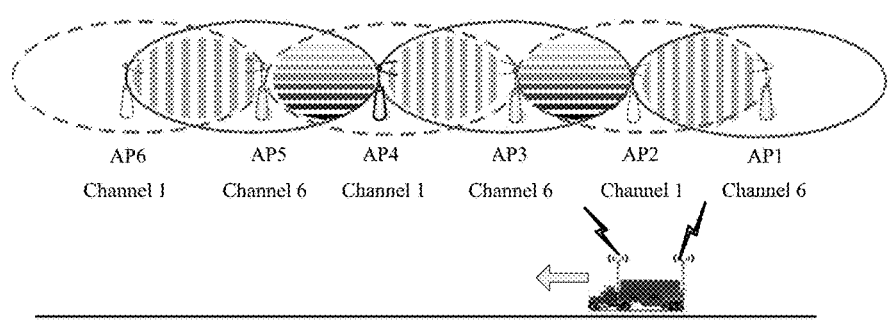
FIG. 4 is a schematic diagram of non-overlaying channel allocation of the present invention.

The directional antenna of the AP in FIG. 4 adopts different directions: the orientation of the directional antennas of AP1, AP3, AP5 . . . AP2$n$+1 is consistent with the moving direction of the MN; the signal coverage regions of the APs are represented with solid lines, and channel 1 is adopted; the orientation of the directional antennas of AP2, AP4, AP6 . . . AP2$n$ is opposite to the moving direction of the MN; the signal coverage regions of the APs are represented with dotted lines, and channel 6 is adopted. The distances between adjacent APs are almost equal; the coverage regions of APs with the same antenna direction are not overlaid, while the coverage regions of adjacent APs with different antenna directions are partially overlaid.

The antenna direction of the wireless network interface card N1 of the MN is consistent with the moving direction, and the antenna direction of N2 is opposite to the moving direction. It is required that N1 is only connected with AP2$n$ (n is a positive integer) and N2 is only connected with AP2$n$−1 (n is a positive integer). At this moment, the handover between N1 and N2 is not completed by automatic detection, but needs control.

When the MN is in the graphical location, N1 is connected with AP4 and N2 is connected with AP1. When the MN continues to move towards the graphical direction, the handover process is as follows:

1) When the MN reaches the location of the AP3, N2 moves out of the signal coverage range of the AP1 and enters the signal coverage range of the AP3. N2 is switched from the AP1 to the AP3. The handover process is completed in a period that the MN passes through shaded portions of vertical lines in the drawing. At this moment, the signal of the AP4 is being enhanced and N1 keeps connected with the AP4.

2) When the MN reaches the location of the AP4, N1 moves out of the signal coverage range of the AP4 and enters the signal coverage range of the AP6. N1 is switched from the AP4 to the AP6. The handover process is completed in a period that the MN passes through shaded portions of horizontal lines in the drawing. At this moment, the signal strength of the AP3 is enough to keep connected with N2.

Figure 5:
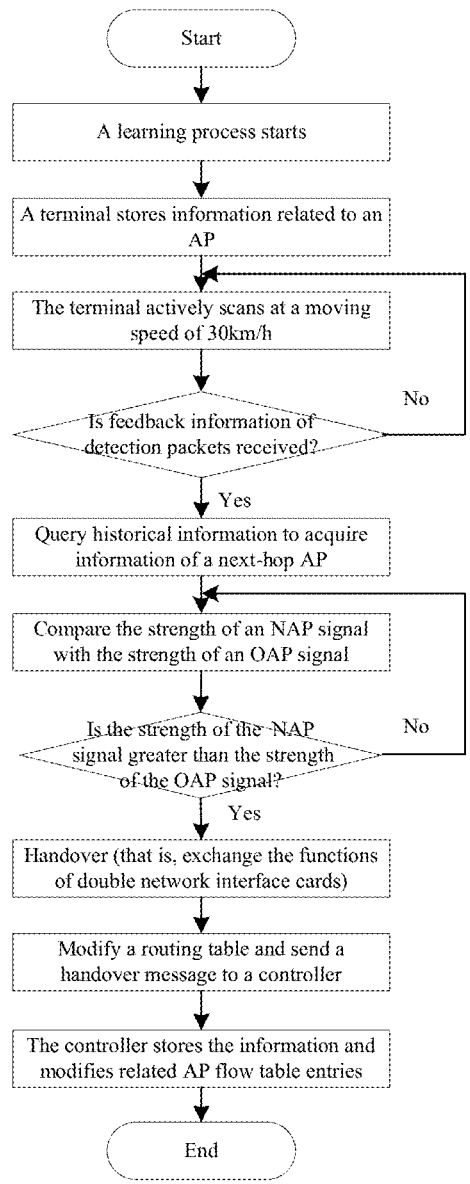
FIG. 5 is a flow chart of handover of the present invention.

4. Handover Steps: As Shown in FIG. 5.

Step 1: in the learning process, the mobile terminal stores AP basic information scanned on a moving track and a handover sequence, and saves the same into a specific storage unit for invoking in a formal operation process;

step 2: the mobile terminal continuously moves, and continuously transmits detection packets to the periphery by using an active scanning method; and if feedback information is received, it is proved that the detection packets enter other AP coverage ranges;

step 3: when a new AP is scanned, the mobile terminal invokes historical stored information, judges that a next hop shall be switched to which AP, then scans signal strength with respect to a specific AP, monitors the signal strength of the AP in real time and compares the scanned signal strength with the signal strength of the current AP;

step 4: when the signal strength of the next-hop AP is greater than the signal strength of the currently accessed AP, a handover algorithm is triggered, namely, functions of double wireless network interface cards are exchanged through a bonding technology;

step 5: a routing table of the terminal nodes is modified and a successful handover message is transmitted to a controller;

step 6: after the controller receives the successful handover message, a corresponding flow table is modified and the information is stored into topological information of the controller;

step 7: when the mobile terminal moves off an original AP coverage range, the double wireless network interface cards of the mobile terminal are in a redundant backup functional state, namely, only one wireless network interface card is active; and when one wireless network interface card is down, the other wireless network interface card is immediately backed up into an active state until a next handover process is entered after the new AP is scanned.

We claim:

1. An AP handover method in an industrial mobile network based on double wireless network interface cards, which comprises the following steps:
    step 1: in the learning process, a mobile terminal stores AP basic information scanned on a moving track and a handover sequence, and saves the same into a storage unit of the mobile terminal;
    step 2: in the process of continuous movement of the mobile terminal, detection packets are continuously transmitted to the periphery, and if feedback information is received, it is proved that the detection packets enter other AP coverage ranges;
    step 3: when a new AP is scanned, the mobile terminal invokes historical stored information, judges that a next hop shall be switched to which AP, then scans signal strength with respect to a next-hop AP, monitors the signal strength of the AP in real time and compares the scanned signal strength with the signal strength of the current AP;
    step 4: when the signal strength of the next-hop AP is greater than the signal strength of the currently accessed AP, a handover algorithm is triggered, namely, functions of double wireless network interface cards are exchanged through a bonding technology;
    step 5: a routing table of the mobile terminal is modified and a successful handover message is transmitted to a controller;
    step 6: after the controller receives the successful handover message, a corresponding flow table is modified and the information is stored into topological information of the controller;
    step 7: when the mobile terminal moves off an original AP coverage range, the double wireless network interface cards of the mobile terminal are in a redundant backup functional state, namely, only one wireless network interface card is active; and when one wireless network interface card is down, the other wireless network interface card is immediately backed up into an active state until a next handover process is entered after the new AP is scanned.

2. The AP handover method in the industrial mobile network based on double wireless network interface cards according to claim 1, wherein said AP basic information recorded in the learning process comprises: a relative location of the AP, an SSID of the AP, an address of the AP and a channel of the AP.

3. The AP handover method in the industrial mobile network based on double wireless network interface cards according to claim 1, wherein the handover time in said step 4 is as follows:
    since the AP coverage range is limited, the time when terminal nodes which move quickly are within each AP coverage range is short; after the new AP is scanned by the nodes of the mobile terminal, the mobile terminal enters a signal strength comparison stage; and when the NAP signal strength is greater than or equal to OAP signal strength, the AP is switched and connected to the next-hop AP.

4. The AP handover method in the industrial mobile network based on double wireless network interface cards according to claim 1, wherein said handover comprises three stages: a handover preparation stage, a handover stage and a handover completion stage;
    the handover preparation stage is as follows: a new AP signal is found in the process of data transmission of the MN and the OAP; then, a channel used by the NAP is inquired; and the NAP signal strength is scanned with respect to a specific channel, and compared with the OAP signal strength in real time; the handover stage is as follows: when the NAP signal strength scanned by the MN is greater than or equal to the OAP signal strength, the MN transmits certification and association to the NAP; after a response message is successfully accepted, the MN transmits a handover request to the controller; after the controller confirms the handover, a flow table modification command is issued; and the handover is completed after the flow table is modified in response to the AP, and data transmission can be normally performed.

5. The AP handover method in the industrial mobile network based on double wireless network interface cards according to claim 1, wherein said AP and said mobile terminal have several antenna combinations according to characteristics of different antennas, comprising AP omni-directional antenna/MN directional antenna, AP directional antenna/MN omni-directional antenna, and AP directional antenna/MN directional antenna.

6. The AP handover method in the industrial mobile network based on double wireless network interface cards according to claim 1, wherein double wireless network interface cards are adopted by said mobile terminal.

7. The AP handover method in the industrial mobile network based on double wireless network interface cards according to claim 1, wherein channels for communication between said mobile terminal and an adjacent AP are not overlaid.

* * * * *